United States Patent
Damitz et al.

(10) Patent No.: US 7,066,138 B2
(45) Date of Patent: Jun. 27, 2006

(54) METHOD AND DEVICE FOR CONTROLLING AN INTERNAL COMBUSTION ENGINE

(75) Inventors: Jens Damitz, Illingen (DE); Wolfram Gerwing, Hessigheim (DE); Ruediger Fehrmann, Leonberg (DE); Matthias Schueler, Steinheim (DE); Tobias Kress, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/030,816

(22) Filed: Jan. 7, 2005

(65) Prior Publication Data

US 2005/0145220 A1 Jul. 7, 2005

(30) Foreign Application Priority Data

Jan. 7, 2004 (DE) .................... 10 2004 001 119

(51) Int. Cl.
*F02B 3/00* (2006.01)

(52) U.S. Cl. ...................... 123/299; 123/305
(58) Field of Classification Search ............... 123/299, 123/300, 295, 305, 435, 436, 478
See application file for complete search history.

(56) References Cited

U.S. PATENT DOCUMENTS

| | | | | |
|---|---|---|---|---|
| 6,062,193 A | * | 5/2000 | Gatellier | 123/299 |
| 6,557,532 B1 | * | 5/2003 | Nakayama et al. | 123/490 |
| 6,659,068 B1 | * | 12/2003 | Urushihara et al. | 123/295 |
| 6,705,277 B1 | * | 3/2004 | McGee | 123/299 |
| 6,722,345 B1 | * | 4/2004 | Saeki et al. | 123/435 |
| 6,820,592 B1 | * | 11/2004 | Buck et al. | 123/435 |

FOREIGN PATENT DOCUMENTS

DE        101 59 017        6/2003

* cited by examiner

*Primary Examiner*—Mahmoud Gimie
(74) *Attorney, Agent, or Firm*—Kenyon & Kenyon LLP (57) ABSTRACT

A method and device for controlling an internal combustion engine in which a first variable characterizing the pressure in the combustion chamber of at least one cylinder in the internal combustion engine is detected by at least one sensor. A second variable is determined on the basis of the first variable. Features which are assigned to different partial injections are obtained by forming the difference within the second variable.

9 Claims, 5 Drawing Sheets

METHOD AND DEVICE FOR CONTROLLING AN INTERNAL COMBUSTION ENGINE

FIELD OF THE INVENTION

The present invention relates to a method and device for controlling an internal combustion engine.

BACKGROUND INFORMATION

German Published Patent Application No. 101 59 017 describes a method and device for controlling an internal combustion engine in which at least one sensor is provided for detecting a first variable which characterizes the pressure in the combustion chamber of at least one cylinder. A second variable which characterizes the combustion process in the corresponding combustion chamber is determined on the basis of the first variable. Essentially, the change in the first variable and/or a variable which characterizes the combustion process is determined.

In diesel engines, injection in a combustion chamber is divided into a plurality of partial injections. This results in a greater degree of freedom in optimizing the target variables, fuel consumption, emission, and comfort. Furthermore, to implement exhaust gas treatment systems such as particle filters and NOx accumulator-type catalytic converters, further partial injections are needed after the main injection. Special measures are required to achieve precise fuel metering, in the case of partial injections in particular.

SUMMARY OF THE INVENTION

Substantially improved fuel metering is achievable by using the procedure according to the present invention. In the event of partial injections in particular, in which the injected fuel amounts are in the tolerance range of the injection system, the performance of the internal combustion engine is improved significantly.

It is particularly advantageous if a first variable characterizing the pressure in the combustion chamber of at least one cylinder of the engine is detected using at least one sensor, a second variable being determined on the basis of the first variable, and features associated with the different partial injections being obtained by forming the difference of the second variable at two points in time or angular positions. These points in time or angular positions are selected in such a way that they are located between two combustions. The total heating curve or the total combustion curve is preferably used as the second variable.

For this purpose, the heating curve is determined on the basis of the first variable. The second variable is determined by integrating the heating curve. This means that the heating curve or the combustion curve is determined from the output signal of the combustion chamber pressure sensor. This variable is essentially determined by the amount of heat released during combustion. The total heating curve or total combustion curve is obtained by integration.

The features characterizing combustion are determined from this total heating curve or total combustion curve. The partial amounts of heat released in the individual partial injections are preferably determined as the features. In the case of full combustion, these correspond to the injection amounts of the partial injections.

Furthermore, the injection starts and/or combustion starts of the different partial injections are determined as features. These features may be used for assignment and/or for forming a difference. This means that the combustion starts are determined by the combustion chamber pressure sensor. The thus determined combustion starts are used as points in time between which the difference of the second variable is computed. This has the advantage that no further sensors are needed.

The position in time or angular position in which the relative maximums occur in the second variable and/or the relative minimums occur in the variable characterizing the heating curve and/or the saddle points of the second variable occur is used as the feature characterizing the start of combustion. These variables are determinable with relative ease.

The thus determined features are preferably supplied to a regulator as an actual value. This permits accurate control of the internal combustion engine. The injection amount in particular may be very accurately set. The released partial amounts of heat or the partial amounts of fuel computed therefrom are preferably supplied to the regulator. This is particularly advantageous in the pilot injection, because the pilot injection must be very accurately selected. In the event of an excessively small pilot injection amount, the desired effects on the combustion noise are not achieved. In the event of an excessively large pilot injection amount, increased harmful emissions occur.

The procedure is not limited to regulating the pilot injection amount; it may also be used in other partial injections such as main injection and/or post-injection. It is advantageous that the injection amount or the injection duration and/or the start of injection of one or more pilot injections and/or of one or more main injections and/or of one or more post-injections may be readily determined based on the combustion chamber pressure signal. The injection starts are used for dividing the amount of heat among the individual partial injections.

Since the amounts of heat are analyzed, injections in which no combustion occurs may also be analyzed. In this case the required heat of evaporation is used as a basis for the analysis.

According to the present invention, the contributions of the individual partial injections to the total heating curve or the total combustion curve are determined from the total heating curve or the total combustion curve by forming the difference. The features which also result from the combustion chamber pressure signal are used for selecting the points in time or angular positions at which the values, from which the differences are formed, are computed to characterize the heat amounts or injection amounts.

DETAILED DESCRIPTION

Figure 1:
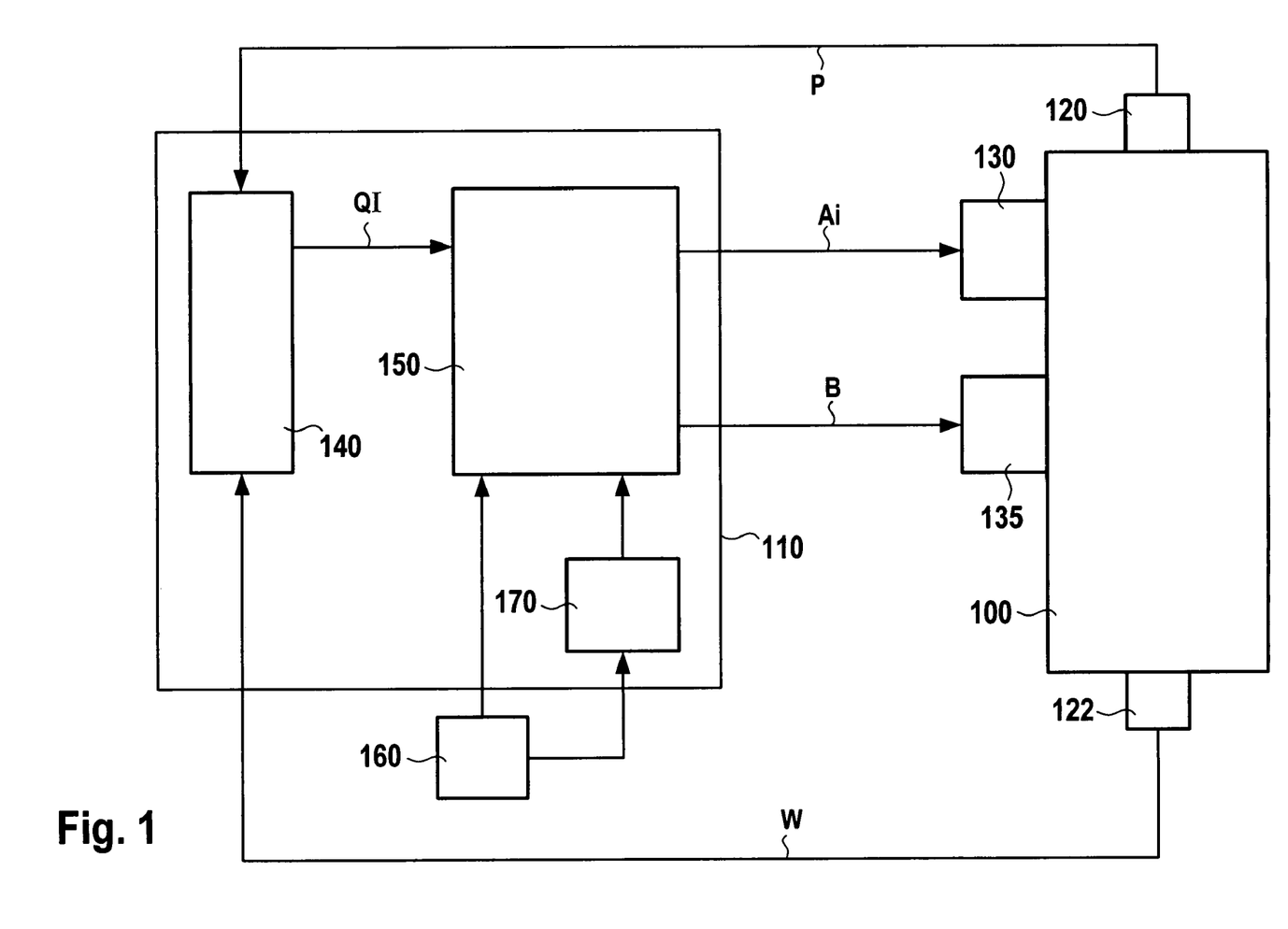
FIG. 1 shows a block diagram of a device for carrying out the method according to the present invention.

FIG. 1 shows the procedure according to the present invention with reference to a block diagram. At least one pressure sensor 120 and one angle sensor 122 are situated on an internal combustion engine 100. Pressure sensor 120 delivers a signal P, which characterizes the pressure in at least one combustion chamber of the engine. In a first embodiment, only one pressure sensor is provided, which is situated on a representative cylinder and characterizes the pressure in this cylinder. In a second embodiment, a pressure sensor which outputs a signal characterizing the pressure in the combustion chamber of the particular cylinder is situated at each cylinder of the engine.

Angle sensor 122 is preferably situated on the crankshaft of the engine and delivers a high-resolution angle signal W characterizing the angular position of the crankshaft. Alternatively, the angle sensor may also be situated on the camshaft of the engine.

Furthermore, a first actuator 130 and a second actuator 135 are situated on the engine. The actuators and the sensors are connected to a control unit 110.

Signal P of pressure sensor 120 and signal W of angle sensor 122 are supplied to an analyzer unit 140, which preferably forms a subunit of control unit 110. Analyzer unit 140 delivers a signal QI to a function unit 150. The function unit in turn supplies a first manipulated variable Ai to first actuator 130 and a second manipulated variable B to second actuator 135. First manipulated variable Ai is preferably a cylinder-specific manipulated variable, which is predefinable for each individual cylinder. Second manipulated variable B is a manipulated variable for the entire engine for activating actuator 135, which controls a global variable.

First manipulated variables Ai are preferably the activation time and/or the activation start of an injection. An injection of the work cycle is preferably divided into a plurality of partial injections. Manipulated variable Ai here is the activation time and/or the activation start of at least one of the partial injections. Normally at least one main injection, at least one pilot injection, and at least one post-injection are provided as partial injections. The procedure according to the present invention is particularly advantageous in the main injection and the pilot injection. In addition or alternatively to the activation time and/or activation start, the rate of injection of the partial injection may also be used as the controlled variable. In this case, this is the curve of the injection amount over time or angle unit.

Manipulated variables for the entire engine include in particular the injection pressure and/or the rail pressure and/or boost pressure and/or further manipulated variables which influence the amount of air supplied to the engine, such as the exhaust gas recirculation rate.

Furthermore, the output signals of an additional function unit 170, which like function unit 150 processes the output signals of additional sensors 160 situated in the area of the engine, are supplied to function unit 150. Additional function unit 170 may be a control unit for controlling the exhaust gas recirculation or one of the above-mentioned global manipulated variables, for example.

The cylinder pressure curves of all cylinders Pi are preferably detected individually by combustion chamber pressure sensors. According to one alternative, only one cylinder considered to be representative is provided with pressure detection. In either case, a high-resolution angle signal W is used as a reference variable for computing both the angular position and the gradient. As an alternative, time may also be used for calculating the gradient.

The sensor signals pressure P and angle W are supplied to analyzer unit 140, which is typically a component of the engine controller. Their function is to form feature variables QI which are hereinafter also referred to as features and are preferably supplied to a regulator as actual values and/or are limited to permissible values by comparing them to one and/or more threshold values.

Heating curve DQ denotes the heat transferred to the working gas per crankshaft angle by combustion. The unit of the heating curve is normally [J/°KW] or appropriate conversions. The combustion curve represents a similar variable. Unlike the heating curve, however, the combustion curve includes the total heat released during combustion. Therefore, the combustion curve is essentially greater than the heating curve by the heat dissipated through the combustion chamber walls per angle unit.

Applying the first principle of thermodynamics, the heating curve and/or combustion curve is/are computed using the known caloric content of combustion gas and fuel, as well as the engine geometry data, with the aid of certain model assumptions regarding the cylinder pressure curve.

According to the above-mentioned definitions of the heating curve, total heating curve Q represents the integral of heating curve DQ over the crankshaft angle. The total combustion curve corresponds to the integral of the combustion curve over the crankshaft angle.

Figure 2A:
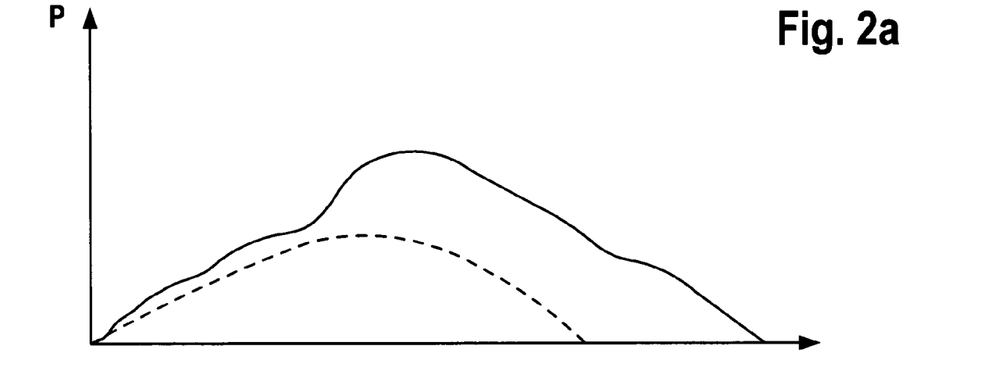
FIG. 2 shows different signals plotted over time.
Figure 2B:
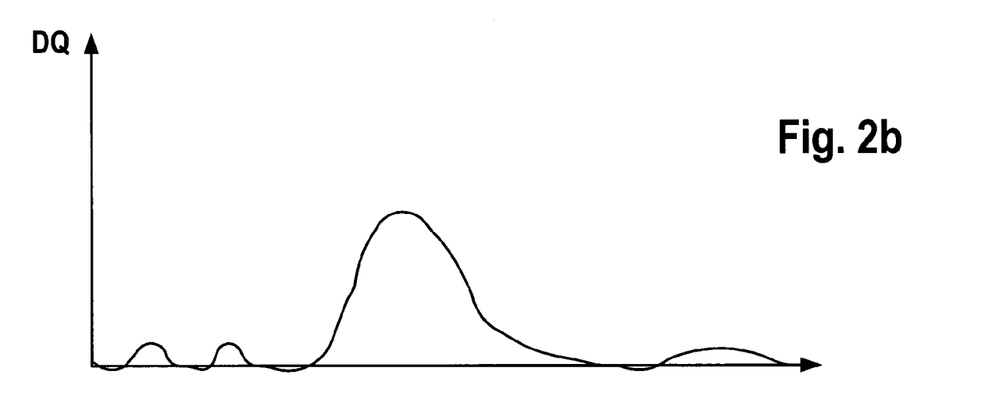
Figure 2C:
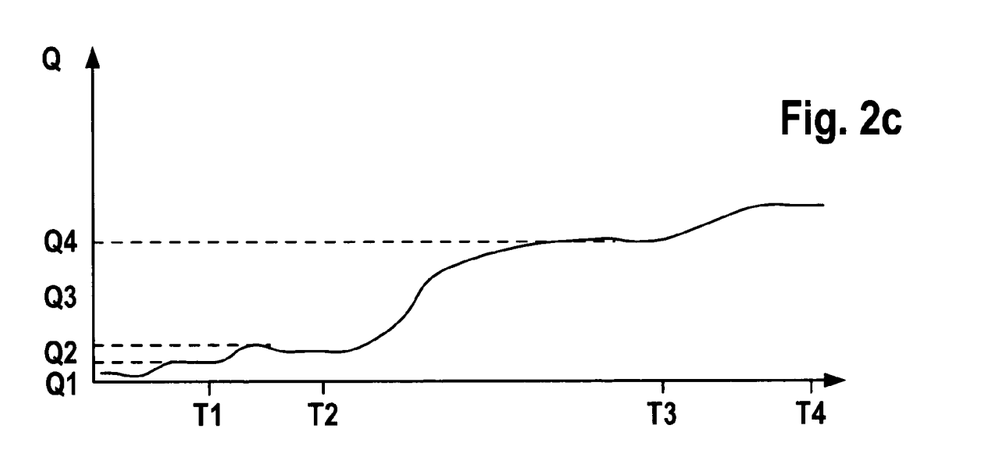

FIG. 2*a* shows pressure curve P for an operating point during combustion having two pilot injections, one main injection and one post-injection plotted by a solid line over time or over the crankshaft position of the engine. Furthermore, the compression pressure is plotted by a dashed line. In FIG. 2*b*, heating curve DQ is likewise plotted over time or over the crankshaft position of the engine. In FIG. 2*c*, total heating curve Q is plotted over the same variables. Total heating curve Q is the integrated signal of heating curve DQ. The heating curve is the heat transferred to the working gas per unit of time or unit of crankshaft revolution. The partial injections are recognizable in all three signals. Each of the partial combustions results in a brief increase in pressure signal P with respect to the compression curve (not shown). For the heating curve, a brief increase and drop in the released heat occurs during each combustion. For total heating curve Q, the signal increases by a certain value during each combustion. FIG. 2 shows a combustion having one main injection, two pilot injections, and one post-injection. The number of illustrated partial injections is merely exemplary. The procedure according to the present invention may also be used for other numbers of partial injections.

FIG. 2 shows that the individual combustions of the individual partial injection amounts are recognizable in the heating curve or in the total heating curve.

By dividing the injection amount among a plurality of partial injections, the tolerance demands for the partial amounts increase for unchanged demands for the accuracy of the total amount. The ever lower limiting values for harmful vehicle emissions contribute to this trend. The procedure according to the present invention makes it possible to improve combustion process regulation in an internal combustion engine. In particular, simple regulation of the pilot injection amount to setpoint values kept constant over the useful life is made possible during combustion, thereby allowing an optimization reserve in the compromise design between noise and emissions, which is customary today.

According to the present invention, the released partial amounts of heat Q1 through Q4 are determined as features from the total heating curve by dividing total amount QG into partial combustions by forming the difference. The saddle points or relative maximums in the total heating curve which are formed after completion of the particular partial combustion are preferably used as criteria for the division. Alternatively, the relative minimums in the heating curve may also be used for separating the partial combustions. Additionally, the injection times and the injection durations may be used as criteria for recognizing partial combustions. Using estimated values for the expected ignition lag, this injection data may delimit the angular range in which partial combustion may occur. This improves the recognizability of partial combustions.

This means that, according to the present invention, the amount of heat released within a certain time period or angle interval may be determined by forming a difference between two values of the total heating curve at two points in time or two angular positions, this angle interval being assigned to a certain partial injection. The limits of these intervals are determined by saddle points or the relative maximums in the total heating curve. Alternatively, the limits of the intervals are defined by the relative minimums of the heating curve. Furthermore, the limits of the intervals may be computed from the times or durations of injection. Instead of the times and durations of injection, variables representing these variables may also be used.

Points in time T1, T2, T3, and/or T4 or the angular positions at which the individual partial combustions are completed are determined in a first step. These points in time are also considered feature variables and are determined by analyzer unit 140 from the combustion chamber pressure signal and/or additional variables. This may be accomplished, for example, by determining the times or angular positions at which the time derivative of the total heating curve, i.e., the heating curve, assumes the value zero and changes the sign from the "before" range to the "after" range (relative maximum of the total heating curve), or assumes the value zero and preserves the positive sign (saddle point of the total heating curve). Differences Q1, Q2, Q3 and/or Q4 of the values of the total heating curve at these times, or in these angular positions, are formed in a second step.

These thus determined differences correspond to partial amounts of heat Q1, Q2, Q3 and/or Q4 of the particular partial combustion or the corresponding partial injection. These thus determined partial heat amounts Q1 through Q4 characterize an injected mass, i.e., an injection amount, of the particular partial injections and are compared according to the present invention to the particular setpoint heat amounts. This difference between setpoint and actual partial heat amounts is supplied to a regulator which then corrects the associated partial injection amount accordingly.

The analysis of the total heating curve is particularly suitable because each increase in the total heating curve is assignable to a partial combustion.

In one embodiment, as an alternative to the heat amount, the injected mass computed back from the heat amount may also be regulated. The corresponding conversion factors are stored in characteristics maps as a function of operating parameters, such as load and rotational speeds in particular.

Depending on the embodiment, a single partial injection, such as the pilot injection, may be regulated. Alternatively, more than one or all partial injections may also be regulated.

Partial injections which do not combust, such as a late post-injection, which are used for regenerating an exhaust gas treatment system, and which do not result in release of heat, or partial injections which do not combust separately from other partial injection amounts, but combust at a later time due to an extended ignition lag, as in the case of homogeneous combustion, for example, may also be accurately controlled or regulated using the procedure according to the present invention. Such injections do not result in release of heat, but instead consume heat due to their heat of evaporation. Contrary to release of heat, this does not result in an increase in pressure, but in a slight drop in pressure or in a smaller increase. This means that, in contrast to FIG. 2, no increase but a gradual drop occurs in the total heating curve. Using appropriate analysis, the corresponding partial heat amounts corresponding to the heat amounts of evaporation may be computed and the corresponding fuel amounts may be determined from these heat amounts.

Figure 3:
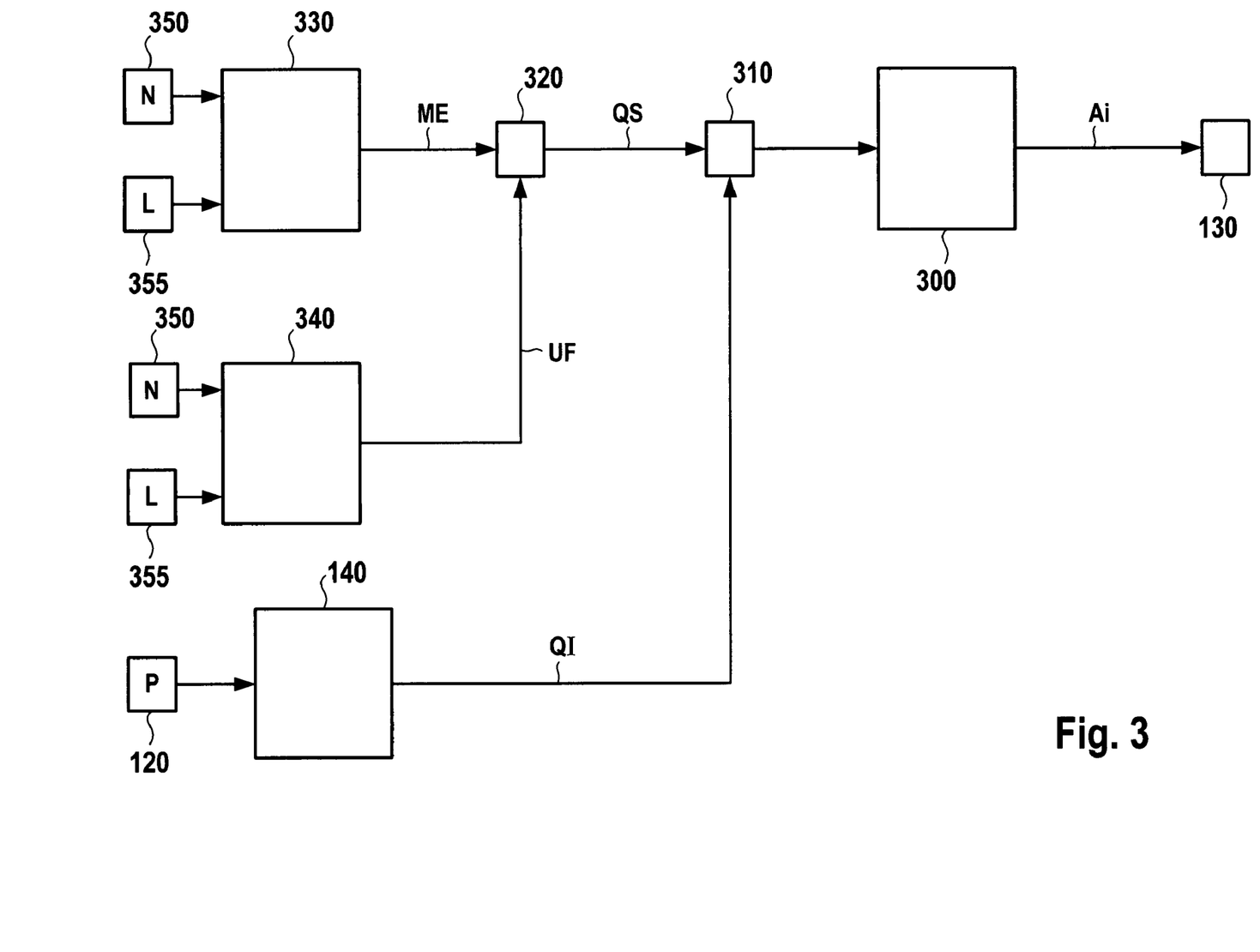
FIG. 3 shows a first illustration of an appropriate regulator structure.

FIG. 3 shows a corresponding regulator structure. In FIG. 3, regulator 300 supplies a trigger signal Ai to actuator 130. The output signal of node 310 is supplied to the regulator. Node 310 receives output signal QI of analyzer unit 140 having a negative sign and output signal QS of node 320 having a positive sign. Node 320 receives the output signals of a first characteristics map 330 and a second characteristics map 340. Characteristics maps 340 and 330 receive the output signals of different sensors 350, 355, which deliver signals characterizing the operating state of the engine. Signals related to the load of the engine and to the speed of the engine are preferably processed.

The procedure is described below using the example of a pilot injection. The procedure according to the present invention, however, is not limited to the pilot injection. It may be used for all partial injections. A setpoint value for injection amount ME of the pilot injection is stored as a function of different operating states, such as load and speed, in first characteristics map 330. Conversion factor UF used for converting the injection amount into a heat amount is stored in second characteristics map 340. By gating setpoint injection amount ME and conversion factor 320, the setpoint value of heat amount QS which is transferred to the working gas by the pilot injection is obtained preferably additively and/or multiplicatively. Analyzer unit 140 computes the corresponding actual heat amount QI from the pressure signal delivered by pressure sensor 120. Setpoint heat amounts QS and QI are compared in node 310. The difference is then supplied to regulator 300. From the difference between the setpoint value and actual value, the regulator computes a manipulated variable Ai to be supplied to actuator 130. The amount of the pilot injection or the activation time and/or the start of pilot injection may be adjusted as appropriate.

In the illustrated embodiment, the amount of heat is determined from the injection amount and compared to the actual value. Alternatively, a suitable conversion factor may be determined, stored in a characteristics map, and gated with the actual heat amount. The setpoint value for the injection amount is obtained by gating actual heat amount QI with a suitable conversion factor. This actual value of the injection amount is then compared to the output signal of first characteristics map 330, used as a setpoint value, and supplied to an appropriate regulator.

Furthermore, adaptation may be provided alternatively or in addition to regulation. In this case, the setpoint heat amount is predefined as a function of the operating state of the engine and adapted during operation. Adaptation takes place by predefining and comparing different features which are determined from the cylinder pressure curve. Such a feature may be the maximum pressure gradient in an angular range or a maximum of the heating curve, for example.

Information on the combustion may be obtained directly by measuring the cylinder pressure. Measuring the cylinder pressure, rather than the structure-borne noise, has the advantage that more information may be obtained regarding the engine state. This is due to the fact that the cylinder pressure sensor records the actual pressure curves, while only mechanical vibrations are detected from structure-borne noise. The cylinder pressure may be measured and analyzed from the time the vehicle leaves the factory over its entire service life.

Combustion regulation of direct-injection engines based on the cylinder pressure makes it possible to improve the particle, NOx, and/or noise emission values via measures taken within the engine. Furthermore, tolerances, in particular manufacturing tolerances, may be compensated for. Combustion regulation provides substantial consumption and emission advantages for future homogeneous or partially homogeneous self-igniting combustion. By using self-teaching characteristics maps, the number of required characteristics maps, i.e., the time needed for the application, may be considerably reduced.

In contrast to other regulation principles in internal combustion engines, features characterizing the combustion are directly defined as the setpoint state in the procedure according to the present invention instead of predefining setpoint values for engine events, such as time of injection, injection amount, or injection pressure. The features characterizing combustion are computed from the cylinder pressure curve and thus from the energy release rate. The parameters of the engine are set individually for each cylinder via a regulator. The output values of the regulator are also adapted individually for each cylinder during operation. This makes an agile control of the operating processes possible. Furthermore, this makes it possible to reduce the number of signals, the necessary amount of data, and the effort needed to fill the characteristics maps with data.

The cylinders are preferably adapted individually. This is the case in particular when individual manipulated variables are used for each cylinder. Alternatively, adaptation may also be performed on the basis of values averaged over all cylinders. This is the case in particular if manipulated variables for the entire engine are used.

Figure 4:
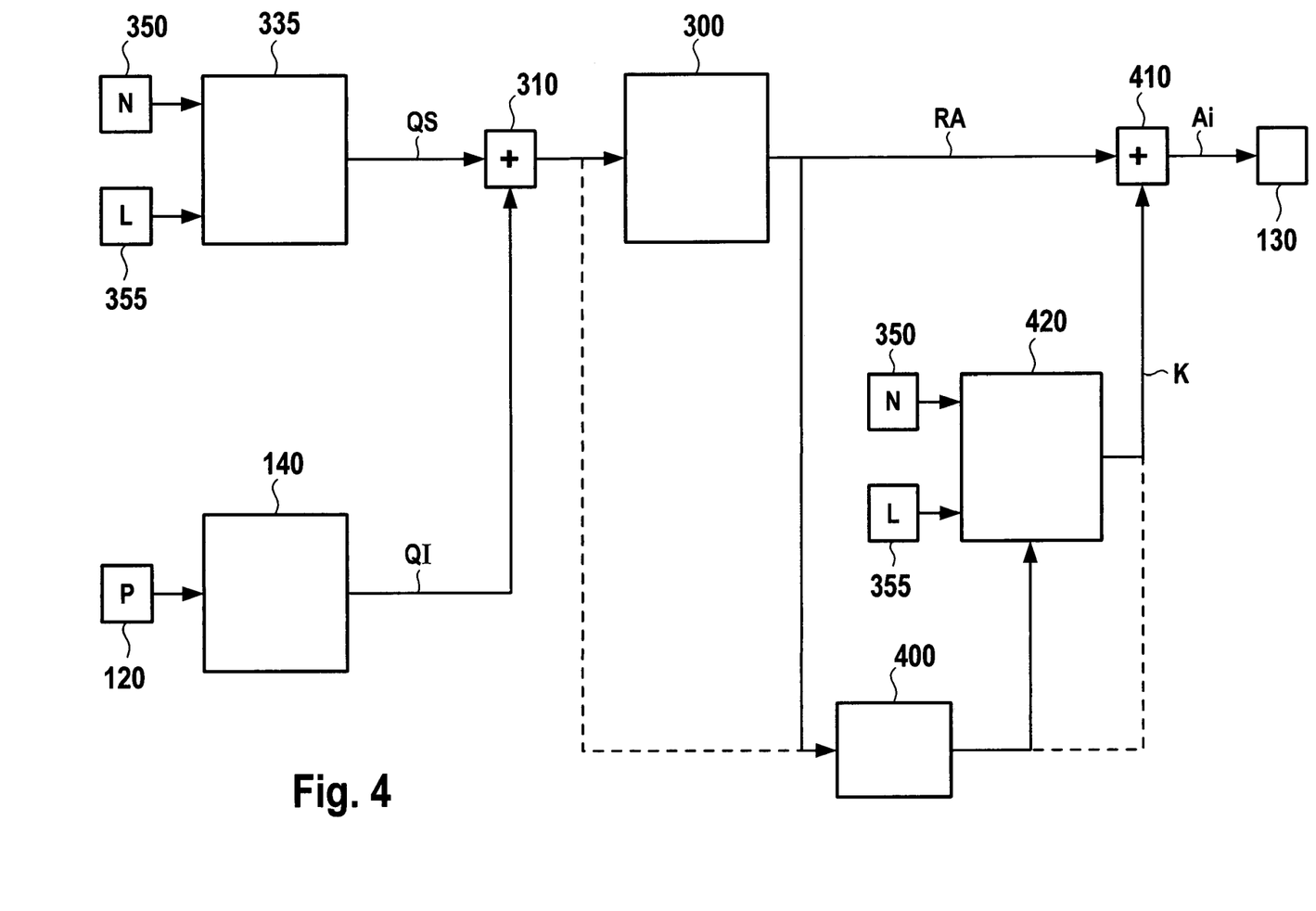
FIG. 4 shows a second illustration of an appropriate regulator structure.

FIG. 4 shows a corresponding procedure as a block diagram. Elements previously described in FIG. 3 are provided with the same reference numerals. The output signal of regulator 300 is additionally supplied to an adapter 400. The output signal of the regulator is also supplied to actuator 130 via a node 410. Output signal K of a pilot control characteristics map 420 is applied to the second input of node 410. Pilot control characteristics map 420 receives the output signal of adapter 400 and signals N and/or L which characterize different operating variables of the engine.

In another embodiment, the output variable of the adapter is not supplied to characteristics map 420, but the output variable of characteristics map 420 is corrected using the output variable of the adapter.

In another embodiment, the output signal of node 310, i.e., the system deviation of regulator 300, is supplied to adapter 400.

The setpoint value of the heat amount is stored in characteristics map 335, as in first characteristics map 330 of FIG. 3, as a function of the operating state of the engine. Alternatively, this basic value may be predefined, as in FIG. 3, on the basis of the setpoint value of the injection amount and a conversion factor.

Pilot control characteristics map 420 is provided in addition to FIG. 3. The trigger signals for actuator 130 are stored in this characteristics map as a function of the operating state of the engine. If regulator 300 recognizes that variable QI to be regulated differs from setpoint value QS, it sends an appropriate output signal to node 410. This means: If the values of characteristics map 420 are not optimally predefined, regulator 300 corrects the deviation of variable QI. Furthermore, the adapter adapts characteristics map 420 on the basis of the system deviation and/or the output signal of regulator 30. This means that adapter 400 changes the values of the characteristics map in such a way that actual value QI approaches setpoint value QS. Alternatively, the adapter may also define multiplicative and/or additive correction values for correcting the output signal of characteristics map 420 and the output signal may be corrected using these values.

A regulator or at least a characteristics map 420 is preferably provided for each cylinder of the engine. Alternatively to feature QI, which is obtained from the above-described heating curve, other features derived from the combustion chamber pressure and/or a structure-borne noise sensor may also be used as controlled variables. Such features may include the start of a combustion and/or the center of gravity of the combustion. These features may be determined from the combustion chamber pressure or the structure-borne noise signal.

It is particularly advantageous that in a factory-new engine, this characteristics map 420 is populated with a uniform value for all operating points and/or all cylinders. The corresponding values are then determined and written into characteristics map 420 during operation of the engine.

In one embodiment, the setpoint value of one feature is corrected as a function of other features. This means that a first feature is regulated to a predefined setpoint value, and the setpoint value is corrected, i.e., adapted, as a function of a second feature.

Figure 5:
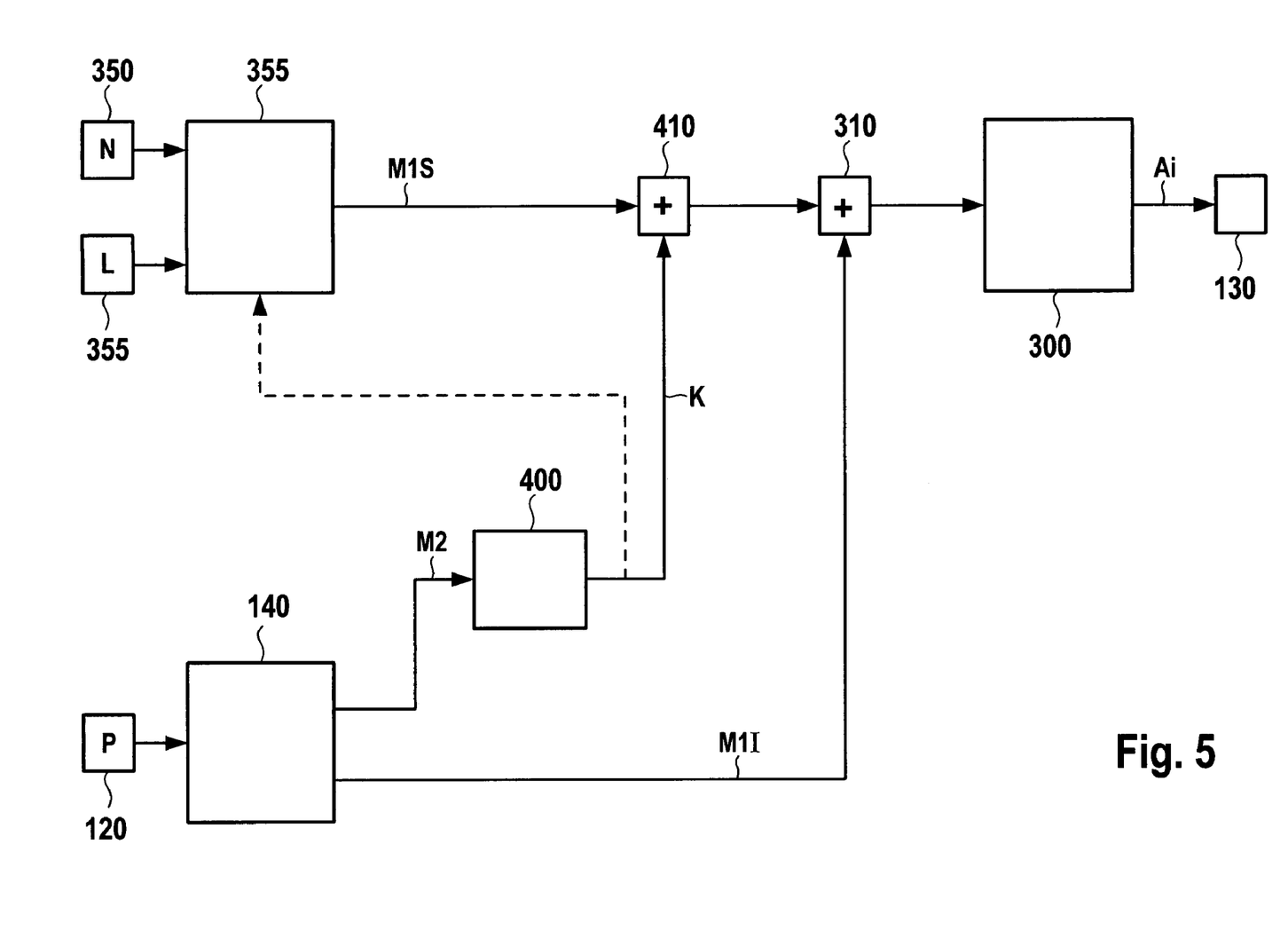
FIG. 5 shows a third illustration of an appropriate regulator structure.

FIG. 5 illustrates a corresponding regulator structure. Regulator 300 outputs trigger signal Ai to actuator 130. The output signal of node 310 is supplied to the regulator. Node 310 receives output signal M1I of analyzer unit 140 having a negative sign and output signal M1S of node 410 having a positive sign. Node 410 receives the output signal of a first characteristics map 335. Characteristics map 335 also receives the output signals of different sensors 350, 355, which deliver signals characterizing the operating state of the engine. Signals related to the load of the engine and the speed of the engine are preferably processed. Node 410 receives an output signal K of an adapter 400. Node 310 and adapter 400 receive features M1I and M2 from analyzer unit 140. These may be the same features or different features.

The procedure is described below using the example of the start and center of gravity of a combustion. However, the procedure according to the present invention is not limited to these combustion features. It may be used for any desired features determined from the combustion chamber pressure signal or a signal of a structure-borne noise sensor which characterize the combustion process.

A setpoint value of combustion start M1S is stored in first characteristics map 335 as a function of different operating states, such as load and speed. The actual value of combustion start M1I is provided by analyzer unit 140, which computes actual value M1I based on the combustion chamber pressure signal or another suitable signal which characterizes the combustion process. Setpoint value M1S and actual value M1I are compared at node 310. The difference is then supplied to regulator 300. Based on the difference between the setpoint and actual values, the regulator computes a corresponding manipulated variable Ai to be supplied to actuator 130. The injection start or the activation start may be adjusted as appropriate.

According to the present invention, another feature M2 is determined by analyzer unit 140 based on the combustion chamber pressure signal or another suitable signal which characterizes the combustion process. This may be the center of gravity of the combustion, for example. Based on this feature M2, the adapter computes a correction value for correcting setpoint value M1S. This is selected so that the center of gravity of the combustion approaches a desired value.

In the illustrated embodiment, output signal M1S of characteristics map 335 is corrected using correction value K, i.e., the output signal is adapted. In an alternative embodiment, the characteristics map values in characteristics map 335 are corrected using correction value K. This means that the characteristics map values are adapted. This embodiment is illustrated in FIG. 5 by a dashed line.

Instead of the combustion center of gravity and the combustion start, the regulator structure illustrated in FIG. 5 may also process other pairs of features. Features derived from suitable signals characterizing the combustion process and delivered by a combustion chamber pressure sensor, a structure-borne noise sensor, or another sensor, are suitable as features.

What is claimed is:

1. A method for controlling an internal combustion engine, comprising:
    detecting via at least one sensor a first variable characterizing a pressure in a combustion chamber of at least one cylinder of the internal combustion engine;
    determining a second variable on the basis of the first variable; and
    obtaining features that are assigned to different partial injections by forming a difference in the second variable;
    wherein the features characterize previous actual injection amounts of the different partial injections.

2. The method as recited in claim 1, further comprising: determining, on the basis of the first variable, a third variable characterizing a heating curve is determined, wherein:
    the determining of the second variable includes integrating the third variable.

3. The method as recited in claim 1, further comprising: determining additional features that characterize at least one of an injection start and a combustion start of the different partial injections;
    assigning the additional features to the different partial injections; and
    forming the difference based on the additional features.

4. The method as recited in claim 1, wherein the second variable corresponds to one of a total heating curve and a total combustion curve.

5. The method as recited in claim 1, further comprising at least one of:
    assigning the features to the different partial injections based on at least one of relative maximums in the second variable and relative minimums of a variable characterizing the heating curve; and
    assigning the features to the different partial injections based on saddle points of the second variable.

6. The method as recited in claim 1, further comprising: supplying the features to a regulator as actual values.

7. The method as recited in claim 6, wherein the regulator adjusts an injection amount.

8. The method as recited in claim 6, wherein the regulator adjusts one of an injection amount, an injection duration, and an injection start of at least one of at least one pilot injection, at least one main injection, and at least one post-injection.

9. A device for controlling an internal combustion engine, comprising:
    an arrangement for detecting via at least one sensor a first variable characterizing a pressure in a combustion chamber of at least one cylinder of the internal combustion engine;
    an arrangement for determining a second variable on the basis of the first variable; and
    an arrangement for obtaining features that are assigned to different partial injections by forming a difference in the second variable;
    wherein the features characterize previous actual injection amounts of the different partial injections.

* * * * *